Dec. 15, 1931.  A. J. GRANBERG  1,836,238
GREASE METER
Filed Aug. 27, 1928   2 Sheets-Sheet 1
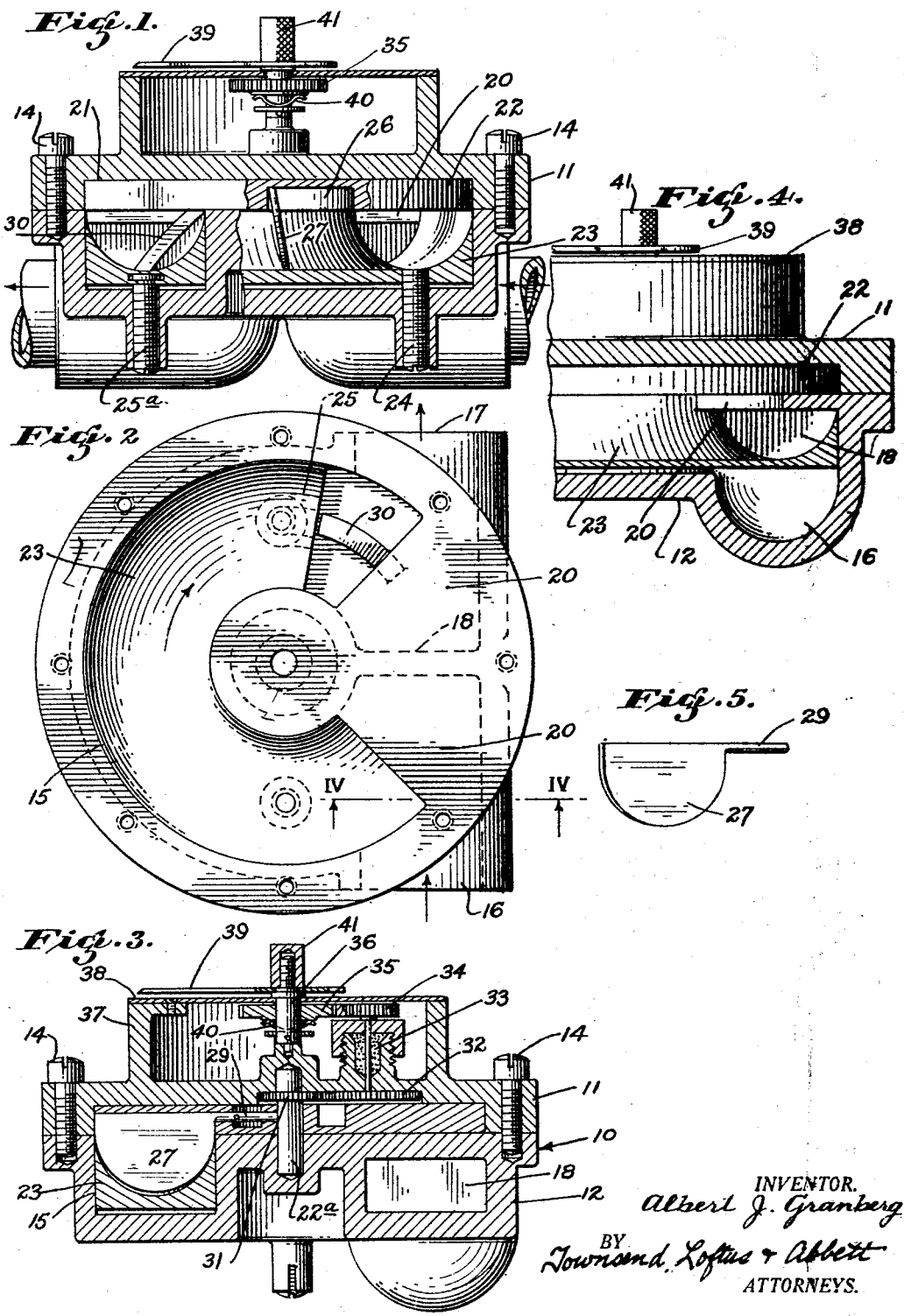
INVENTOR.
Albert J. Granberg
BY Townsend, Loftus & Abbett
ATTORNEYS.

Dec. 15, 1931.  A. J. GRANBERG  1,836,238
GREASE METER
Filed Aug. 27, 1928   2 Sheets-Sheet 2

INVENTOR.
Albert J. Granberg
BY
Townsend, Loftus & Abbett
ATTORNEYS.

Patented Dec. 15, 1931

1,836,238

UNITED STATES PATENT OFFICE

ALBERT J. GRANBERG, OF BERKELEY, CALIFORNIA, ASSIGNOR TO RALPH N. BRODIE COMPANY, OF OAKLAND, CALIFORNIA, A CORPORATION OF CALIFORNIA

GREASE METER

Application filed August 27, 1928. Serial No. 302,405.

This invention relates to meters for measuring the quantities of heavy lubricants such as grease and particularly pertains to the type of meter disclosed in my Letters Patent of the United States entitled "Fluid meter," issued June 24, 1930, and bearing #1,767,210.

It is the principal object of the present invention to provide a generally improved meter of the character referred to which is of simple and inexpensive construction and which will operate efficiently to accurately measure heavy lubricant such as greases passed therethrough and indicate the quantity of grease discharged from the meter by weight or volume.

In carrying out this object into practice I provide a meter casing having an annular channel therein connected at one end to an intake port and at the other end to an outlet port. A rotor is disposed in cooperative relation to this channel and carries a plurality of blades extending within the channel to be engaged by the grease injected into the meter, so that the rotor will be revolved by the advancement of the grease through the meter. Rotation of the rotor is utilized to operate an indicating mechanism in direct ratio to the volume and speed of the lubricant passing through the meter, so that the indicating mechanism will accurately indicate the quantity of grease passing through the meter either by weight or by volume.

One form which the invention may assume is exemplified in the following description and illustrated by way of example in the accompanying drawings, in which:

Fig. 1 is a vertical section through the meter taken on line I—I of Fig. 6.

Fig. 2 is a plan view of the meter with the upper half thereof removed.

Fig. 3 is a vertical section through the meter taken on line III—III of Fig. 6.

Fig. 4 is a fragmentary view in section taken on line IV—IV of Fig. 2 and showing the upper portion of the meter casing in position.

Fig. 5 is a perspective view of one of the blades employed.

Figure 6:
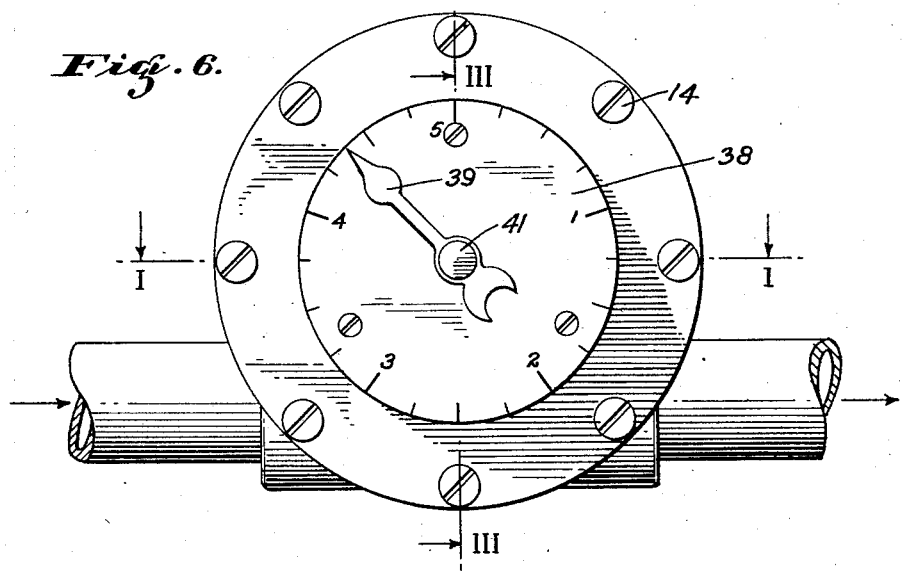
Fig. 6 is a plan view of the meter.
Figure 7:
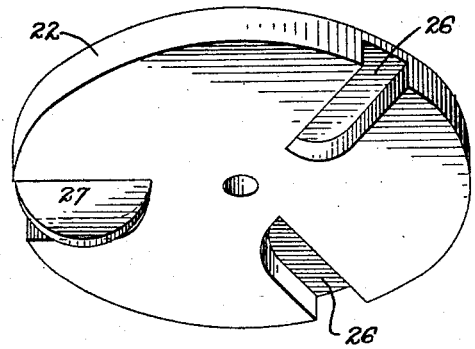
Fig. 7 is a perspective view of the rotor.
Figure 8:
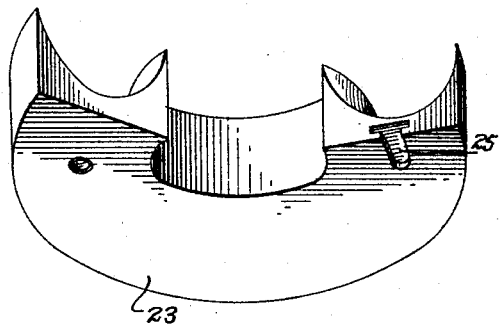
Fig. 8 is a perspective view of the adjustment member.

Referring more particularly to the accompanying drawings, 10 indicates a cylindrical meter casing formed in two sections 11 and 12. These two sections are fixed together by cap screws 14 or in any other preferred manner. The lower section 12 is formed with an arcuate channel 15 which is arranged concentric to the center of the meter casing. The channel 15 is rectangular in cross section and communicates at one end with an inlet port 16 and at its other end with a discharge port 17. A partition wall 18 is arranged intermediate the ports 16 and 17 so that grease injected into the inlet port 16 will be forced to travel around the channel before discharging through the discharge port 17.

It will be noticed from Fig. 2 that the opposite ends of the channel contiguous to the inlet and discharge ports are covered by a top partition 20, the upper surface of which is flush with the top of the lower section 12 of the meter casing.

Fitted within the channel 15 is an adjustment member 23 which is segmental and of dimensions so that it will snugly fit within the bottom of the channel 15 as illustrated in the drawings. The upper surface of this adjustment member is concave and is formed on a radius centered between the sides of the channel 15 at the level of the top of the channel. After the adjustment member is placed in the channel 15, an arcuate passageway is formed in the channel 15, which passageway is substantially semi-circular in cross-section. This adjustment member 23 is adjustable in the channel 15 so that the cross sectional area of the passageway adjacent the discharge port 17 may be varied to adjust the meter.

To raise and lower the adjustment member to vary the cross sectional area of the passageway at the discharge end, one end of the adjustment member is anchored to the bottom of the meter casing by means of a screw 24. At the other end of the adjustment member a T-shaped slot 25 is formed in its lower surface, which slot is engaged by the head of an adjusting screw 25a which is threaded upwardly through the bottom of the meter casing as shown in Fig. 1. By revolving the screw it is adjusted vertically in the channel 15 and vertically adjusts the end of the adjustment member adjacent the discharge port.

As before stated, adjusting this member vertically changes the cross sectional area of the passageway at the discharge end and varies the amount of material passing therethrough with a given amount of operation of the meter. Inasmuch as one end of the adjustment member is anchored, there must be sufficient flexibility in the adjustment member to permit such adjustment.

The top or upper section 11 of the casing is formed with a circular chamber 21 concentric with the channel 15 and in alignment therewith. The circular chamber 21 is of the same exterior diameter as the channel and is positioned directly above the channel as illustrated in Figs. 1 and 3 of the drawings. Rotatably mounted in this chamber 21 is a rotor 22 which is fixed upon a shaft 22a having a bearing at its lower end in the lower casing section 12 and at its upper end in the casing section 11.

The rotor 22 is of a thickness substantially the same as the depth of the chamber 21 so that the bottom surface of the rotor will be positioned at the top of the channel 15 in the lower casing section 12. Formed in the lower surface of the rotor 22 is a plurality of recesses 26. In the present instance I have shown three of these recesses 26 which are spaced at equal distances apart and at the outer periphery of the rotor. The radial dimension of these recesses 26 is the same as the width of the channel 15 with which they align.

Pivotally supported by the rotor are radially extending blades 27 one blade being provided for each recess 26. These blades are normally disposed vertically with relation to the meter and have a shaft portion 29 rotatably supported by the center portion of the rotor. The blades 27 proper are disposed one within each recess 26 at one side thereof so that when the blades are disposed horizontally they will nest within the recesses. The shape of the blades 27 correspond with the shape of the passageway above the upper surface of the adjustment member so that when the rotor is revolved the blades 27 will travel around the passageway with the semicircular lower ends of the blades in engagement with the concave upper surface of the adjustment member 23. The blades 27 are free to pivot about their pivotal supports so that during the operation of the meter when the blades align with the partition 20 over the ends of the channel, the blades will automatically be moved to an unobstructing position and will automatically return to normal position within the passageway after they have passed over the partition.

To assist the blades in moving to an unobstructing position upon approaching the partition 20 over the ends of the channel, I provide a cam 30 which projects from the end of the partition 20 at the discharge end of the channel. This cam 30 presents a tapered surface from the bottom of the upper surface of the adjustment member to the top of the partition 20. The blades upon engaging this cam 30 will be gently moved upwardly to an unobstructing position within the recesses 26 wherein they remain during their travel over the partition 20.

The blades 27 are arranged at a slight angle to the vertical within the channel 15 so that when the adjustment member is raised or lowered the blades will be moved slightly to correspond therewith. This would not be possible if the blades 27 were disposed perfectly vertically.

Therefore, it is obvious that regardless of the position of the adjustment member within the channel 15 the blades 27 will completely fill the passageway during their travel.

It is obvious that when grease is injected into the intake port 16 that it will engage the blades 27 causing the rotor to revolve as the grease advances around the passageway. As the cross sectional area of the stream of grease passing through the meter may be determined, the ratio between it and the revolution of the rotor will be a known quantity.

Therefore, I utilize the movement of the rotor to operate an indicating device to indicate in standard weight measures the amount of grease passing through the meter. To accomplish this, the shaft 22a is fitted with a pinion 31 which is in mesh with a gear 32, the shaft of which extends through a packing gland 33. The shaft of the gear 32 is also fitted with a gear 34 in mesh with a gear 35 on a pointer shaft 36.

The mechanism just described is all enclosed within an indicator casing 37 formed directly on the top of the upper meter casing section 11. The top of the indicator casing is formed by a dial 38 suitably calibrated as shown in Fig. 6. A pointer 39 is secured on the pointer shaft 36 so that when the rotor is operated the pointer will be driven through the medium of the gear train to visibly indicate on the dial 38 the number of pounds of grease passing through the meter. The ratio of the gears is such that the accurate weight of the grease discharging will be indicated on the dial.

In order to turn back the pointer to zero without operating the rotor and the gear mechanism a spring clutch 40 is provided between the gear 35 and the pointer shaft 36. There is sufficient spring tension in this clutch to cause the gear 35 and the shaft 36 to revolve in unison during normal operation of the meter. However, this clutch may be slipped to permit the pointer to be turned back to zero without revolving the gear 35. In other words the knob 41 on the outer end of the pointer shaft 36 may be grasped to revolve the shaft and the pointer in a counter-clockwise direction without revolving the gear 35. During such operation the clutch 40 merely slips as it is of insufficient tension to overcome the resistance offered by the remainder of the mechanism to the turning of the gear 35.

In operation of the device it is constructed and assembled as shown in the drawings and the intake port 16 is suitably connected to a conduit conveying grease under pressure and the discharge port 17 is connected with a discharge nozzle or conduit. The grease under pressure entering the intake port 16 will seek to travel around the passageway toward the discharge port 17. During such travel the blades 27 will be encountered and the blades and rotor will advance together with the grease around the passageway. As the blades become adjacent the discharge port 17 they will ride upwardly on the cam 30 and pass over the partition 20. As they pass over the partition they will drop down into the passageway for a succeeding operation.

To adjust the meter so that it will indicate the exact amount of grease discharged the adjustment screw may be revolved to vertically adjust the adjustment member 23 so that the volume of grease discharged will coincide exactly with that indicated on the dial. As the rotor is revolved it will through the medium of the gear train described operate the pointer 39 which will indicate on the calibrated dial 38 the weight of the grease discharged during the operation of the meter. It is understood, however, that the calibrations on the dial may indicate the amount of the grease discharged either by weight or by volume.

From the foregoing it is obvious that I have provided a comparatively simple and inexpensive meter which will accurately measure greases or other heavy lubricant and visibly indicate the quantity thereof on a dial.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a casing having an intake and a discharge port, said casing being formed with a passageway extending between said ports, said passageway having a vertically adjustable bottom, a movable member arranged in the casing and adapted to move in parallelism with said passageway, a plurality of blades attached to said movable member and extending into said passageway, said blades conforming in configuration with said passageway whereby material passing through said passageway will move said movable member through the medium of said blades, said blades being pivotally suspended whereby they may substantially correspond with the configuration of the cross-section of said passageway regardless of slight changes of the disposition of the bottom of the passageway.

2. A meter comprising a casing having inlet and discharge ports, said casing being formed with an arcuate passageway formed between said ports, a rotor revolubly mounted in the casing concentric with said passageway, blades attached to said rotor and extending into said passageway and conforming in configuration with the cross-section of said passageway whereby material passing through the passageway will revolve the rotor through the medium of the blades, the bottom of said passageway being adjustable to vary its cross sectional area, said blades being pivotally suspended whereby they will effectively correspond to the cross sectional area of said passageway when adjusted, and indicating means driven by the rotor to give indications proportional to the quantity of material passing through the meter.

3. A meter comprising a casing having inlet and discharge ports, said casing being formed with a horizontally arranged passageway formed arcuately therein and having one end communicating with the inlet port and the other with the outlet port whereby material injected into the inlet port will pass through the channel to the outlet port, a rotor rotatably mounted in the casing to revolve concentrically with the passageway, blades attached to the rotor and extending into said passageway and substantially conforming in configuration with the cross-section of said passageway whereby the material passing along the channel will impart its movement to the blades and consequently to the rotor, separating means preventing passage of material between the ends of the passageway, said blades being pivotally mounted enabling them to pass over said separating means.

4. A meter comprising a casing having inlet and discharge ports, said casing being formed with a horizontally arranged passageway formed arcuately in the casing and having one end communicating with the inlet port and the other with the outlet port whereby material injected into the inlet port will pass through the passageway to the outlet port, a rotor rotatably mounted in the casing to revolve concentrically with the passageway, blades attached to the rotor and extending into said passageway and conforming in configuration with the cross-section of said passageway whereby the material passing along the channel will impart its movement to the blades and consequently to the rotor, separating means preventing passage of material between the ends of the passageway, said blades being pivotally mounted enabling them to pass over said separating means, the bottom of said passageway being vertically adjustable, the pivotal mounting of said blades also enabling them to substantially conform with the cross sectional area of the passageway regardless of slight variations in the position of its bottom.

5. A meter comprising a casing having inlet and discharge ports, said casing being formed with an arcuate passageway arranged horizontally within the casing and communicating at one end with the inlet port and at the other end with the discharge port, an adjustment member forming the bottom of the passageway, said adjustment member having a concave upper surface, one end of said adjustment member being anchored, the other end being vertically movable, means for vertically adjusting the movable end of said adjustment member, a rotor revolubly mounted in the casing to revolve concentrically with relation to the passageway, blades arranged radially about the rotor and pivotally attached thereto and extending into the passageway transversely thereof, said blades conforming in configuration and dimensions with the passageway whereby material passing through the passageway will impart rotation to the rotor through the medium of the blades, said blades pivoting in a plane enabling them to conform substantially with the cross section of the passageway regardless of the position of the adjustment member, and indicating means driven by the rotor to indicate the quantity of material discharged from the meter as determined by the rotation of the rotor.

ALBERT J. GRANBERG.